United States Patent
LaPointe et al.

(10) Patent No.: US 9,347,359 B2
(45) Date of Patent: May 24, 2016

(54) AIR DITHERING FOR INTERNAL COMBUSTION ENGINE SYSTEM

(71) Applicant: Cummins IP, Inc., Columbus, IN (US)

(72) Inventors: Leon A. LaPointe, Columbus, IN (US); Scott Miles, Indianapolis, IN (US); Jay Shah, Columbus, IN (US)

(73) Assignee: CUMMINS IP, INC., Minneapolis, MN (US)

( * ) Notice: Subject to any disclaimer, the term of this patent is extended or adjusted under 35 U.S.C. 154(b) by 0 days.

(21) Appl. No.: 13/834,220

(22) Filed: Mar. 15, 2013

(65) Prior Publication Data

US 2014/0260196 A1    Sep. 18, 2014

(51) Int. Cl.
| | | |
|---|---|---|
| *F01N 3/00* | (2006.01) | |
| *F01N 3/02* | (2006.01) | |
| *F01N 3/10* | (2006.01) | |
| *F01N 3/20* | (2006.01) | |
| *F01N 3/30* | (2006.01) | |
| *F01N 3/32* | (2006.01) | |
| *F01N 9/00* | (2006.01) | |

(52) U.S. Cl.
CPC *F01N 3/30* (2013.01); *F01N 3/103* (2013.01); *F01N 3/32* (2013.01); *F01N 9/00* (2013.01); *F01N 2560/025* (2013.01); *F01N 2900/0601* (2013.01); *F01N 2900/1402* (2013.01); *F01N 2900/1624* (2013.01); *Y02T 10/20* (2013.01); *Y02T 10/47* (2013.01)

(58) Field of Classification Search
USPC .............. 60/285, 287, 288, 289, 290, 295
See application file for complete search history.

(56) References Cited

U.S. PATENT DOCUMENTS

| | | | |
|---|---|---|---|
| 3,862,540 A | | 1/1975 | Harvey |
| 3,903,695 A | | 9/1975 | Nakada |
| 4,199,938 A | * | 4/1980 | Nakase et al. ............... 60/274 |
| 4,394,351 A | | 7/1983 | Gast |
| 5,379,586 A | | 1/1995 | Honji et al. |
| 6,192,678 B1 | | 2/2001 | Tachibana |
| 7,047,727 B2 | | 5/2006 | Tanaka et al. |
| 7,059,120 B2 | * | 6/2006 | Nakagawa et al. ........... 60/289 |
| 7,367,184 B2 | * | 5/2008 | Nakano et al. ............... 60/289 |
| 2002/0155039 A1 | * | 10/2002 | Itoh et al. .................... 422/171 |

* cited by examiner

*Primary Examiner* — Audrey K Bradley
*Assistant Examiner* — Dapinder Singh
(74) *Attorney, Agent, or Firm* — Foley & Lardner LLP

(57) ABSTRACT

Described herein is an air dithering system for an internal combustion engine generating exhaust gas that includes an exhaust line in exhaust gas receiving communication with the internal combustion engine. The system also includes an exhaust aftertreatment component positioned within the exhaust line in exhaust gas receiving communication with exhaust gas in the exhaust line. Further, the system includes an air injector in air injecting communication with exhaust gas in the exhaust line at a location downstream of the internal combustion engine and upstream of the exhaust aftertreatment component.

14 Claims, 3 Drawing Sheets

AIR DITHERING FOR INTERNAL COMBUSTION ENGINE SYSTEM

GOVERNMENT LICENSE RIGHTS

This invention was made with government support under Contract No. P/P#63817. The government has certain rights in the invention.

FIELD

The subject matter of the present application relates generally to controlling operation of an internal combustion engine system, and more particularly to adjusting an air-to-fuel ratio in an exhaust gas stream using an air dithering technique.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type.

Exhaust aftertreatment systems receive and treat exhaust gas generated by an internal combustion engine. Typical exhaust aftertreatment systems include any of various components configured to reduce the level of regulated exhaust emissions present in the exhaust gas. For example, some exhaust aftertreatment systems include any of various catalysts or catalytic convertors. The catalyst may be, or the catalytic convertor may include, an oxidation catalyst that stores oxygen. An oxidation catalyst utilizes oxygen in the exhaust gas stream to oxidize carbon monoxide into carbon dioxide and/or oxidize (e.g., burn) unburned hydrocarbons. During lean exhaust conditions (e.g., higher than a 1:1 air-to-fuel ratio), excess oxygen not used to oxidize carbon monoxide or unburned hydrocarbons can be stored on the walls of the catalyst. When lean exhaust conditions transition to rich exhaust conditions (e.g., lower than a 1:1 air-to-fuel ratio), the stored oxygen is released from the catalyst to supplement the lower quantities of oxygen in the exhaust gas stream in the oxidization of carbon monoxide or unburned hydrocarbons. Then, when rich exhaust conditions transition back to lean exhaust conditions, the oxygen released from the catalyst is replaced with excess oxygen in the exhaust gas stream as mentioned above.

Some conventional internal combustion engine systems are configured to control the combustion of fuel within the cylinders of an engine to affect a change in the air-to-fuel ratio within the exhaust gas stream generated by the engine. Fuel combustion properties typically are regulated by adjusting the amount of fuel added to intake air or charge air whether before or after the air is introduced into the cylinders. Basically, the air-to-fuel ratio of the fuel and air mixture within the cylinders corresponds with the air-to-fuel ratio of the exhaust gas resulting from the combustion event. Therefore, increasing the amount of fuel added to the intake air correspondingly decreases the air-to-fuel ratio in the exhaust gas, and decreasing the amount of fuel added to the intake air correspondingly increases the air-to-fuel ratio in the exhaust gas. Some internal combustion engines include external fuel injection strategies that include injecting fuel directly into exhaust gas to adjust the air-to-fuel ratio of the exhaust gas.

Most fuel injection strategies for adjusting the air-to-fuel ratio of an exhaust gas stream include injecting fuel into the air intake stream upstream of the combustion cylinders of the engine. The fuel may be injected solely by means of a main fuel injector in a main fuel injection event. However, because of the relatively large amounts of fuel being injected in a main fuel injection event, smaller, more precise, and more responsive adjustments (e.g., fuel dithering) to the air-to-fuel ratio in the air intake can be achieved by smaller fuel injectors positioned at various locations within an air intake system of the engine. For example, a smaller fuel injector may be positioned within the air intake system to inject fuel into the air intake stream just upstream of a turbocharger compressor during a fuel dithering event. Alternatively, or in addition, one or more smaller fuel injectors may be positioned within the air intake system to inject fuel into the air intake stream downstream of the turbocharger compressor and upstream of a throttle valve, and/or downstream of the throttle valve and upstream of an intake manifold, during a fuel dithering event. Further, for direct fuel injection engines, fuel dithering can be accomplished by adjusting the amount of fuel injected directly into the combustion cylinders.

As mentioned above, oxidation catalysts are positioned in an exhaust aftertreatment system well downstream of the combustions cylinders of the engine. Because of the relatively long distance (e.g., large volume), and high number of components, between the fuel injection sites of the main fuel injector, or dithering fuel injectors, and the oxidation catalyst, changes to the air-to-fuel ratio in the air intake stream affected by the injection of fuel are not present in the exhaust gas entering the oxidation catalyst until after a significant delay. Accordingly, the responsiveness of fuel dithering on the air-to-fuel ratio of exhaust gas entering an oxidation catalyst can be less than desirable, particularly during quickly changing transient operating conditions of the engine.

Further, potential unpredictable and inconsistent behavior of the several components between oxidation catalysts and fuel injection points may lead to unpredictable, inconsistent, and imprecise air-to-fuel ratio results at the entrance to the oxidation catalysts.

In addition to poor responsiveness, because conventional fuel dithering includes injecting additional fuel into the air intake stream upstream of the combustion cylinders, fuel dithering techniques impact the combustion events occurring in the combustion cylinders. Moreover, the impact fuel dithering techniques have on the combustion events may be negative, such as lower fuel efficiency, higher exhaust temperatures, and higher exhaust gas emissions.

SUMMARY

The subject matter of the present application has been developed in response to the present state of the art, and in particular, in response to the problems and needs in the art that have not yet been fully solved by currently available internal combustion engine systems. For example, as mentioned above, fuel dithering techniques may fail to provide at least one of adequately responsive, predictable, consistent, and precise exhaust air-to-fuel ratio results, and my negatively affect the combustion properties of the engine.

Accordingly, the subject matter of the present application has been developed to provide an internal combustion engine system that overcomes at least some shortcomings of the prior art. More specifically, disclosed herein is an air dithering system and technique for an internal combustion engine system that promotes faster, more responsive, more predictable, more consistent, and/or more precise changes in the exhaust air-to-fuel ratio results. In this manner, according to certain implementations, the air dithering system and technique of the present application is able to affect accurate and consistent changes in the air-to-fuel ratio of exhaust entering an oxidation catalyst at rates that are closer to the transiency rates of the engine than with prior art systems. According to some embodiments, the benefits of the air dithering system and technique described herein are achieved by positioning an air injector in the exhaust gas system to inject air directly into the exhaust gas stream just upstream of an oxidation catalyst. More specifically, the air dithering system, in certain implementations, injects air directly into the exhaust gas stream, as opposed to injecting air into an air intake stream upstream of the engine, which would introduce shortcomings similar to those discussed above for conventional fuel dithering techniques. In this manner, the air dithering system of the present disclosure may, in some embodiments employing a gaseous fuel powered engine, allow the air-to-fuel ratio in the air intake and exhaust streams upstream of the air injection point to remain in a desirably rich condition or environment.

According to one embodiment, an air dithering system for an internal combustion engine generating exhaust gas includes an exhaust line in exhaust gas receiving communication with the internal combustion engine, an exhaust aftertreatment component positioned within the exhaust line in exhaust gas receiving communication with exhaust gas in the exhaust line, and an air injector in air injecting communication with exhaust gas in the exhaust line at a location downstream of the internal combustion engine and upstream of the exhaust aftertreatment component. In some implementations, the air injector is coupled to the exhaust line upstream of the exhaust aftertreatment component. According to some implementations, air injector injects air substantially directly into an inlet of the exhaust aftertreatment component.

In some implementations of the system, the exhaust line is in exhaust providing communication with the atmosphere, and all the air injected by the air injector into the exhaust gas exits into the atmosphere via the exhaust line. All the air injected by the air injector into the exhaust gas can pass through the exhaust aftertreatment component.

According to certain implementations, the system further includes an internal combustion engine generating the exhaust gas. The air-to-fuel ratio of an air and fuel mixture combusted by the internal combustion engine to generate the exhaust gas is less than 1.0, and the air-to-fuel ratio of exhaust gas downstream of the air injector and upstream of the exhaust aftertreatment component is greater than 1.0. The air injector can inject a quantity of air into the exhaust gas sufficient to render an air-to-fuel ratio of the exhaust gas greater than 1.0, where the air-to-fuel ratio of exhaust gas upstream of the air injector can be less than 1.0.

According to some implementations, the system further includes a controller in electronic communication with the air injector. The controller can be configured to control the air injector to inject air into the exhaust gas based on operating conditions of the internal combustion engine. The controller can control the air injector to inject air into the exhaust gas to create a lean condition within the exhaust gas. The exhaust aftertreatment component can include an oxidation catalyst configured to store oxygen. The air injector may inject air into the exhaust gas for replenishing stored oxygen on the oxidation catalyst. The air injector can be an electrically-controlled injector, such as a solenoid-actuated injector.

In certain implementations, the internal combustion engine includes an exhaust gas recirculation (EGR) line in exhaust receiving communication with the exhaust line and exhaust providing communication with the internal combustion engine. The air injector can be in air injecting communication with exhaust gas in the exhaust line at a location downstream of the EGR line.

According to another embodiment, an apparatus for dithering air into an exhaust gas stream generated by an internal combustion engine includes an exhaust aftertreatment condition module that determines an exhaust condition demand. The apparatus also includes an air-to-fuel ratio module that determines an air-to-fuel ratio demand based on the exhaust condition demand. Further, the apparatus includes an air dithering module that generates an air injection command based on the air-to-fuel ratio demand. The exhaust condition demand can include an oxygen storage demand representing a desired quantity of stored oxygen to be added to an oxidation catalyst of an exhaust aftertreatment system. The exhaust condition demand can include a demand for lean exhaust gas conditions. The air-to-fuel ratio demand may represent a desired air-to-fuel ratio of exhaust gas entering an exhaust aftertreatment system, and the air dither module generates the air injection command based on a comparison between a current air-to-fuel ratio of exhaust gas entering the exhaust aftertreatment system and the desired air-to-fuel ratio of exhaust gas entering the exhaust aftertreatment system.

In another embodiment, a method for providing a lean condition in an exhaust gas stream generated by an internal combustion engine operating under a rich condition is disclosed. The method includes determining at least one condition of an exhaust aftertreatment system and requesting a lean condition in the exhaust gas based on the at least one condition of the exhaust aftertreatment system. Further, the method includes injecting air into the exhaust gas in response to requesting the lean condition. The exhaust aftertreatment system can include an oxidation catalyst and the at least one condition may include an oxygen storage condition of the oxidation catalyst. The lean condition in the exhaust gas can be requested based on a deficiency in the oxygen storage condition of the oxidation catalyst.

In certain embodiments, the modules of the apparatus and/or system described herein may each include at least one of logic hardware and executable code, the executable code being stored on one or more memory devices. The executable code may be replaced with a computer processor and computer-readable storage medium that stores executable code executed by the processor.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
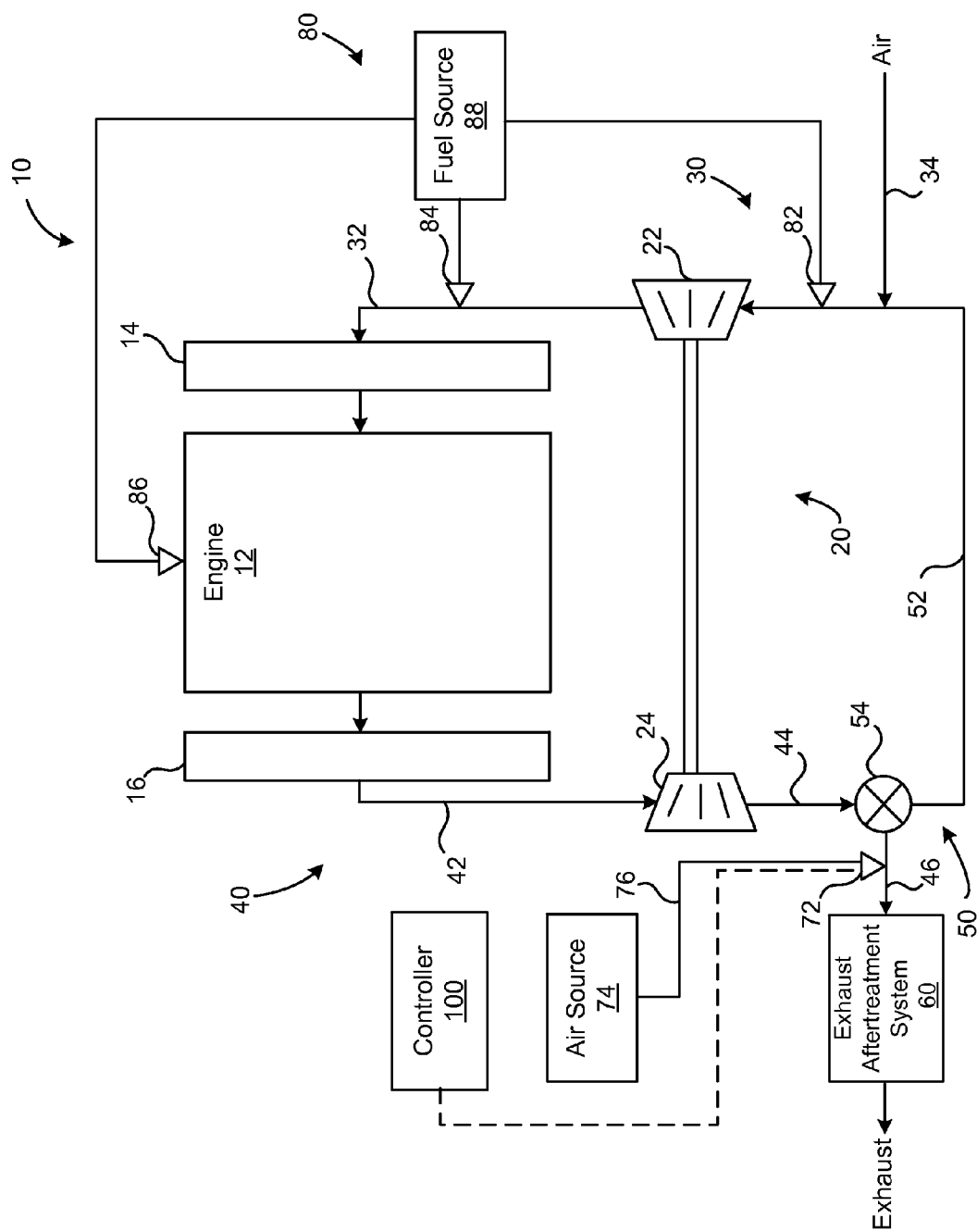
FIG. 1 is a schematic diagram of an internal combustion engine system having an internal combustion engine, an exhaust system, an air dithering system, and a controller in accordance with one representative embodiment.

According to one embodiment depicted in FIG. 1, an internal combustion engine system 10 includes an internal combustion engine 12 powered by a fuel. Although not shown, the engine system 10 may be placed within or form part of a vehicle and be configured to operate and propel the vehicle. The engine 12 may be a compression-ignited engine powered by diesel duel or a spark-ignited engine powered by gasoline, natural gas, hydrogen, or other alternative fuels, or a hybrid of the two. The engine 12 generates power by combusting a fuel and air mixture within a plurality of combustion chambers or cylinders housed by the engine. Typically, the cylinders are formed in an engine block of the engine. The engine 12 can include any of a various number of combustion cylinders, such as twelve, ten, eight, six, and four.

The combustion cylinders of the engine 12 operatively receive air (and/or EGR) from an air handling system 30 and fuel from a fuel delivery system 80. The air handling system 30 includes an air inlet 34 and an intake manifold 14. The air inlet 34 includes an air inlet line vented to the atmosphere, which enables air from the atmosphere to enter the engine 12 via the intake manifold 14. Also, air from the air inlet 34 can be directed into a compressor 22 of a turbocharger 20. The compressor 22 compresses the air before introducing the air into the intake manifold 14. Although not shown, all or a portion of the air from the air inlet 34 can bypass the compressor via actuation of a flow regulating device. The intake manifold 14 includes an outlet operatively coupled to the combustion cylinders of the engine 12 to deliver at least the air from the air inlet 34 into the combustion cylinders of the engine 12.

The air from the atmosphere is combined with fuel from the fuel delivery system 80 either before or after entering the combustion chambers of the engine 12, and the combined air and fuel mixture is combusted in the chambers to power, or otherwise operate, the engine 12. The fuel is selectively delivered to and combined with air in the air handling system 30 by the fuel delivery system 80 in any number of ways. For example, in spark-ignited engine configurations, the fuel delivery system 80 may include one or more fuel injectors (e.g., fuel injectors 82, 84) positioned upstream of the intake manifold 14 to inject fuel from a fuel source 88 into the air stream in the air handling system 30 upstream of intake manifold.

The fuel injector 82 is shown positioned upstream of the turbocharger compressor 22 to inject fuel into the air stream received from the air inlet 34 before the air is compressed by the compressor. In one implementation, the fuel injector 82 is a main fuel injector that injects into the air stream the primary fuel supply associated with a main fuel injection event for normal combustion in the engine 12. In another implementation, the fuel injector 82 is a dithering fuel injector for injecting smaller amounts of fuel into the air stream for more precisely and responsively controlling the air-to-fuel ratio of the air and fuel mixture in the air delivery system 30. In some implementations, the fuel injector 82 represents both a main fuel injector and dithering fuel injector. Although not shown, the air handling system 30 may include an air-fuel mixer upstream of the compressor 22 into which the fuel injector 82 injects fuel.

The fuel injector 84 is shown positioned downstream of the compressor 22 and upstream of the intake manifold 14 to inject fuel into the air compressed or pressurized by the compressor before it enters the air intake. According to one implementation, the fuel injector 84 is a dithering fuel injector for injecting smaller amounts of fuel into the air stream as discussed above. Although not shown, the air handling system 30 may include a cross-pipe extending between the compressor 22 and an intake throttle of the air handling system, and into which the fuel injector 82 injects fuel. Also not shown, the air handling system 30 may include an air charge cooler upstream of the air intake 14, and the fuel injector 84 may be positioned downstream of the air charge cooler. In certain implementations, the fuel injector 84 represents both a dithering fuel injector upstream of an intake throttle and a dithering fuel injector downstream of an air charge cooler.

In addition, or instead of, the fuel injectors 82, 84, for compression-ignited engine configurations, the fuel delivery system 80 may include a fuel injector (e.g., fuel injector 86) configured to inject fuel from the fuel source 88 directly into the engine 12, and more specifically, the combustion cylinders of the engine, such as via a high pressure fuel rail. The fuel injector 86 may be configured to inject the primary fuel supply associated with a main fuel injection event for normal combustion and/or fuel dithering for more precisely and responsively controlling the air-to-fuel ratio of the mixture within the combustion cylinders.

Although the illustrated embodiment depicts various fuel injectors in specific locations, in other embodiments, the fuel delivery system 80 of the engine system 10 can include any number of fuel injectors at any of various locations as desired. Notwithstanding the number and position of the fuel injectors, the fuel injectors (e.g., fuel injectors 82, 84, 86) can be separately controllable independently of each other. The timing and dosage of fuel injected by the fuel injectors can be controlled by a controller 100 via electronic communication lines (not shown). Additionally, in some embodiments, the duel delivery system 80 does not include dithering fuel injectors, such that fuel injection is provided only by a main fuel injector.

The combustion of the air and fuel mixture in the combustion cylinders of the engine 12 drives linearly-actuated or rotary-type pistons. The linear or rotational motion of the pistons rotates a drive shaft that transfers power to a drivetrain (e.g., transmission) of a vehicle to move the vehicle. The combustion characteristics of the engine 12 (e.g., the amount of power generated by the engine 12 and fuel efficiency of the engine) is largely dependent upon the amount and timing of fuel added or injected into the combustion cylinders. For example, under certain operating conditions, the more fuel added to and combusted in the combustion cylinders, generally the higher the power generated by the engine, but the lower the fuel efficiency. The amount and timing of fuel added to the combustion cylinders is dependent upon a variety of operating conditions, such as engine speed, engine load (e.g., demand), vehicle speed, air intake characteristics, pressure, and temperature.

Generally, the amount of fuel to be added to the combustion cylinders, and the timing of such fuel injections relative to a crankcase angle, is obtained from a predetermined fuel map or maps storing fuel addition and/or timing values compared to operating condition values. For example, in one basic implementation, the fuel map includes fuel addition and/or timing values compared with engine speed and engine load demand values. Accordingly, in such an implementation, the amount of fuel to be added to the combustion cylinders is the fuel addition value corresponding with the current engine speed and desired or required engine load. In other implementations, in addition to the engine speed and engine load values, the fuel map also includes one or more additional current operating condition values, such as vehicle speed values, current air intake characteristics values (e.g., air intake mass flow values, are intake mass concentration values, etc.), current pressure values (e.g., air intake pressure, ambient air pressure, exhaust pressure, etc.), and current temperature values (e.g., air intake temperature, ambient air temperature, exhaust temperature, coolant temperature, oil temperature, etc.). Accordingly, in such other implementations, the amount of fuel to be added to the combustion cylinders is the fuel addition value corresponding with the current engine speed and desired engine load, and the one or more additional operating condition values at the current engine speed and desired engine load.

Because the combustion characteristics (e.g., air-to-fuel ratio) of an engine 12 drive the exhaust gas characteristics (e.g., air-to-fuel ratio) of exhaust flowing from the engine and into an exhaust system 40 of the engine system 10, the controller 100 may control operation of the fuel injectors according to desired exhaust gas characteristics. The desired exhaust gas characteristics may include any of various characteristics, such as air-to-fuel ratio, temperature, emission concentrations, and the like, of the exhaust gas stream flowing into an exhaust aftertreatment system 60 of the exhaust system 40. Accordingly, the amount and timing of fuel added to the combustion cylinders may be dependent upon desired exhaust gas characteristics.

A fuel map, table, or control surface for an internal combustion engine of a vehicle is typically stored in the vehicle's electronic control module (ECM) or controller. In the illustrated embodiment, the controller 100 of the engine system 10 stores at least one fuel map. The controller 100 communicates with and/or receives communication from various components of the system 10, such as the engine 12, an accelerator pedal, a clutch, one or more operating conditions sensors, and other possible components, such as on-board diagnostic systems. Generally, the controller 100 controls the operation of the engine system 12 and associated sub-systems, such as the engine 110, air handling system 30, fuel delivery system 80, and exhaust system 40. The controller 100 is depicted in FIG. 1 as a single physical unit, but can include two or more physically separated units or components in some embodiments if desired. In certain embodiments, the controller 100 receives multiple inputs, processes the inputs, and transmits multiple outputs. The multiple inputs may include sensed measurements from the sensors and various user inputs. The inputs are processed by the controller 100 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired fuel consumption characteristics.

Although not shown, the engine system 10 can include various physical sensors, such as temperature sensors, pressure sensors, fuel sensors, exhaust gas flow sensors, and the like, may be strategically disposed throughout the engine system and may be in communication with the controller 100 to monitor operating conditions. These and other operating conditions may also, or alternatively, be determined through the use of virtual sensors via model-based approaches. Engine operating conditions can be ascertained from any of the sensors or from the controller 100's commands to the engine regarding the fraction of exhaust gas recirculation, injection timing, and the like. In one embodiment, information is gathered regarding, for example, fueling rate, engine speed, engine load, fuel injection timing (e.g., SOI, or start of injection), time passed, fraction of exhaust gas recirculation, driving conditions, whether and when regenerations have occurred and the rate such regenerations have removed particulate matter, exhaust flow rate, the amount of $O_2$ and $NO_2$ in the exhaust, filter temperature, exhaust gas pressure, filter particulate load amount and uniformity, etc.

As mentioned above, combustion of the fuel in the cylinders produces exhaust gas that is operatively vented to the exhaust system 40. The exhaust gas is initially vented to an exhaust manifold 16. From the exhaust manifold 16, the exhaust gas is directed into a turbine 24 of the turbocharger 20, and at least one of an EGR system 50 and an exhaust aftertreatment system 60. For example, based at least partially on the operating conditions of the engine, after passing through and driving the turbine 24, at least a portion of the exhaust gas can be directed into the EGR system 50, and at least a portion of the exhaust gas can be directed into the exhaust aftertreatment system 60. The relative portions of exhaust gas entering the respective systems 50, 60 are controlled by the controller 100 via actuation of an EGR valve 54 of the EGR system 50. Generally, the controller 100 determines the relative portions of exhaust gas that should enter the respective systems and commands valves (e.g., the EGR valve 54) to allow a portion of the exhaust corresponding to the determined portions to enter the respective systems. Alternatively, some valves may be mechanically or passively controlled.

In addition to the EGR valve 54, the EGR system 50 includes an EGR line 52 between the exhaust system 40 and the air handling system 30. The EGR valve 54 is selectively controlled by the controller 130 to regulate the flow of exhaust entering the EGR line 52 and the air intake 14, and thus indirectly regulating the flow of exhaust entering the exhaust aftertreatment system 60. When the EGR valve is at least partially open, at least a portion of the engine exhaust enters the air handling system 30 via the EGR line 52 and is recirculated into the combustion chambers of the engine 12 to be combusted with air from the air inlet 34. Prior to entering the combustion chambers, the EGR exhaust gas can be passed through an EGR cooler (not shown) to cool the exhaust gas in order to facilitate increased engine air inlet density.

The exhaust aftertreatment system 60 is positioned along an exhaust line 46 downstream of the EGR valve 54 through which an exhaust gas stream flows from the EGR turbine 24 to the environment via a tailpipe. The exhaust aftertreatment system 60 may include any of various components for reducing regulated emissions in the exhaust gas. For example, although not shown, the exhaust aftertreatment system 60 can include a catalytic component (e.g., an oxidation catalyst), filters, and the like. The exhaust gas may pass through the catalytic component to reduce the number of pollutants in the exhaust gas prior to the gas entering the particulate filter. For example, in certain implementations, the catalytic component is a conventional oxidation catalyst that oxidizes carbon monoxide and hydrocarbons. Typically, for oxidation of the pollutants to occur, the catalyst of the catalytic component should be at a temperature above a predetermined value, e.g., above about 250° C. or about 300° C. in some instances, and adequate oxygen must be present in the exhaust gas stream passing through the oxidation catalyst or stored on the oxidation catalyst. The temperature of the catalytic component can be regulated by controlling the engine output exhaust temperature. The amount of oxygen or air-to-fuel ratio in the exhaust gas stream, and thus the amount of oxygen stored on the oxidation catalyst, can be regulated by the air handling system 30 and fuel injectors of the fuel delivery system 80 as discussed above.

However, as discussed above, because the air handling system 30 and the fuel injectors of the fuel delivery system 80 are positioned a relatively long distance away from the oxidation catalyst of the exhaust aftertreatment system 60, and a high number of components are positioned between the air handling system 30 and the fuel injectors, and the oxidation catalyst, changes to the air-to-fuel ratio in the air intake stream affected by the injection of fuel are not present in the exhaust gas entering the oxidation catalyst until after a significant delay. The delay is particularly problematic during the relatively quick transitions between lean and rich intervals needed by the oxidation catalyst to quickly replenish stored oxygen used in the oxidation process. Should the transition from a rich interval to a lean interval, and from the lean interval back to a rich interval, occur too slowly, sufficient oxygen may not be stored on the oxidation catalyst to accommodate the oxidation process during rich operation conditions. Further, because many engines (e.g., spark-ignited engines) operate more efficiently under rich operating conditions, operation of the engine 12 under lean operating conditions is undesirable. However, in order to create lean conditions in the exhaust gas stream using the air handling system 30 and the fuel injectors requires the engine to be operating under lean operating conditions.

To reduce the above-mentioned shortcomings of air handling systems and fuel injectors upstream of the engine 12, the engine system 10 includes an air dithering system 70 positioned downstream of the engine. The air dithering system 70 includes an air injector 72 fluidly coupled to an air source 74 via an air supply line 76. Although not shown, the air dithering system 70 may also include a pump for pumping air from the air source 74 to the air injector 72. The air injector 72 can be any of various types of injectors known in the art, such as electrically-controlled injectors (e.g., solenoid-actuated injectors). The air injector 72 can be coupled to the exhaust line 46 using any of various coupling techniques, such as welding, fastening, and the like.

As shown, the air injector 72 is positioned in air supplying communication with exhaust gas in the exhaust line 46 at a location between the exhaust aftertreatment system 60 and the EGR line 54. More specifically, the air injector 72 is positioned downstream of the EGR line 54 and upstream of the exhaust aftertreatment system 60. In this manner, air injected by the injector 72 is not introduced back into the engine 12 via the EGR system 50, and is relatively quickly introduced into the exhaust aftertreatment system 60. In some implementations, the air injector 72 is positioned proximate an inlet of an oxidation catalyst of the exhaust aftertreatment system 60. For example, the air injector 72 is positioned to inject air substantially directly into the inlet of the oxidation catalyst. In some implementations, all the air injected into the exhaust gas passes through the oxidation catalyst or exhaust aftertreatment system 60. Moreover, because exhaust exiting the outlet of the oxidation catalyst or exhaust aftertreatment system 60 is expunged to the atmosphere from the exhaust system 40 via an outlet of the exhaust line 46 or tailpipe coupled to the exhaust line, the injected air in its entirety is ultimately expunged into the atmosphere without passing through the engine 12. In engine systems without an EGR system 50, the air injector 72 can be positioned anywhere in the exhaust system 40 downstream of the engine 12.

The air source 74 can be a pressurized air source that receives air from the atmosphere, or may simply be the atmosphere. In alternative implementations, the air source 74 may be an oxygen source storing a volume of relatively pure oxygen gas.

As described above, the air dithering system 70 injects air directly into the exhaust gas stream flowing through the exhaust line 46 just upstream of the exhaust aftertreatment system 60. Because the air is injected just upstream of the aftertreatment system 60 (and associated components, such as an oxidation catalyst), the impact of the injected air on the air-to-fuel ratio of exhaust entering the aftertreatment system 60 is felt much faster (e.g., more responsive) than the adjustments to fuel and air upstream of the engine 12 due to the significantly decreased distance, volume, and number of components between the aftertreatment system and the air injection site. Moreover, because the air dithering system 70 adjusts the air-to-fuel ratio of the exhaust gas, particularly from a rich condition to a lean condition, by injecting air into the exhaust gas stream downstream of the engine 12 and the EGR system 50, the additional air does not affect the combustion characteristics of the engine, which allows the engine to maintain a rich operating environment even though the exhaust aftertreatment system 60 is operating in a lean operating environment.

Figure 2:
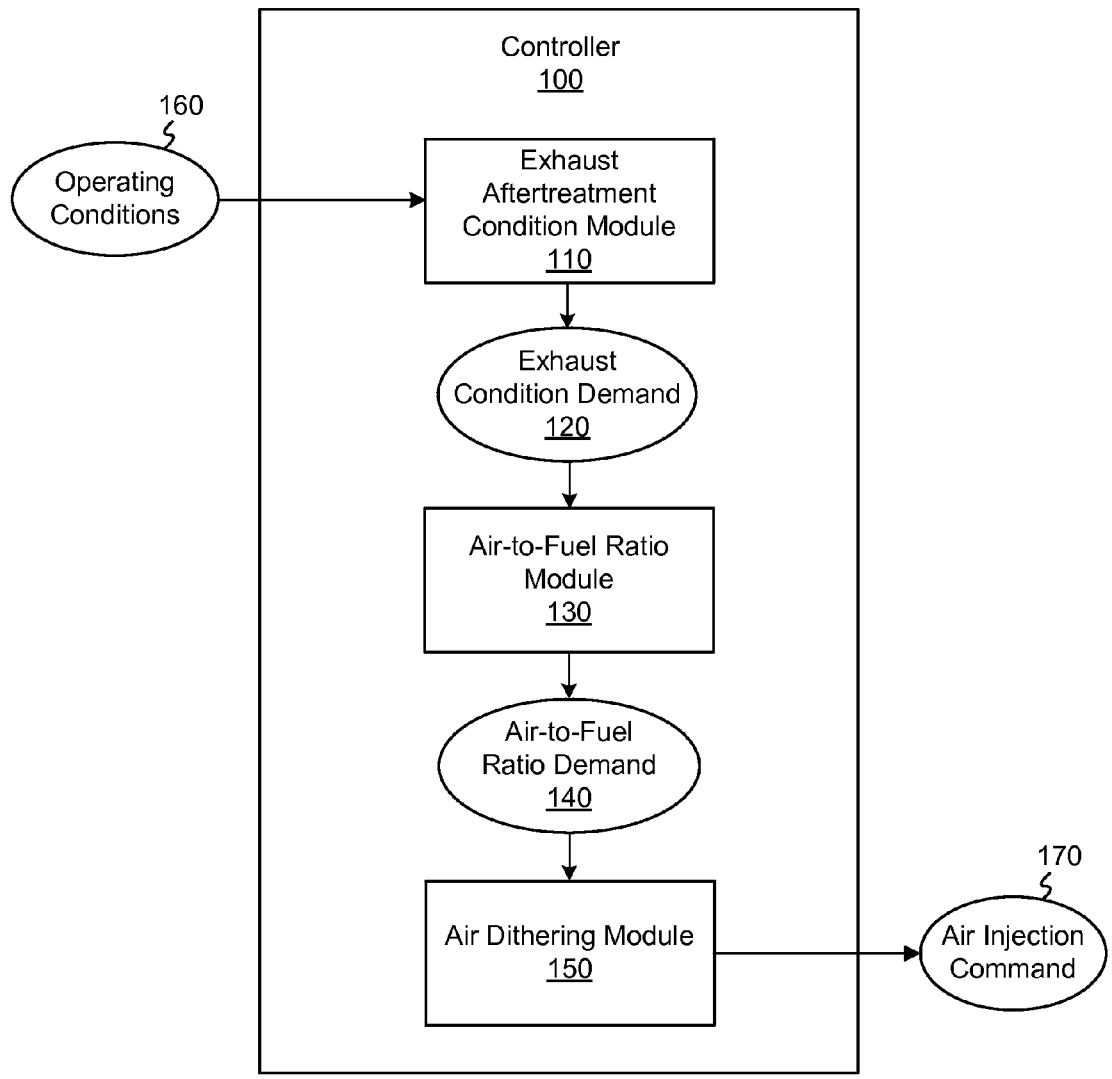
FIG. 2 is a schematic block diagram of the controller of FIG. 1 in accordance with one representative embodiment.

The characteristics (e.g., rate and quantity) of an air injection event (e.g., the injection of air into an exhaust gas stream by the air injector 72) is controlled by the controller 100 via a data communication line. As shown in FIG. 2, the controller 100 generates an air injection command 170, including control data, information, pulses, and/or the like, and transmits the command to the air injector 70. Once received, the air injector 70 is actuated to inject air according to the air injection characteristics dictated by the injection command 170. Generally, the characteristics of the air injection event dictated by the air injection command 170 is dependent on operating conditions 160 of the engine received from physical sensors, virtual sensors, user inputs, stored information, and the like.

The operating conditions 160 are received by an exhaust aftertreatment condition module 110 of the controller 100. The exhaust aftertreatment condition module 110 is configured to determine an exhaust condition demand 120 based on the operating conditions 160 of the engine system 10. In one embodiment, the exhaust condition demand 120 is an oxygen storage demand representing a desired quantity of stored oxygen to be added to an oxidation catalyst of the exhaust aftertreatment system 60. Generally, the desired quantity of stored oxygen to be added to the oxidation catalyst is based on an estimate of oxygen already stored on the oxidation catalyst. Accordingly, the exhaust aftertreatment condition module 110 is configured to estimate the amount of oxygen stored on the oxidation catalyst based on one or more of the operating conditions 160.

In some implementations, the estimate of the amount of oxygen stored on the oxidation catalyst is based on a maximum oxygen storage capacity of the oxidation catalyst, which represents the maximum amount of oxygen that can be stored on the catalyst at a given time. The maximum oxygen storage capacity can be a predicted value for a known catalyst type operating at a predicted condition. For a fresh oxidation catalyst, the maximum oxygen storage capacity can be a predetermined or preset value associated with the type of oxidation catalyst used and determined based on any of various testing techniques. However, the condition of the oxidation catalyst deteriorates over time, which may result in a reduction of the oxygen storage sites available for oxygen storage and a corresponding reduction of the maximum oxygen storage capacity of the oxidation catalyst.

Accordingly, in one embodiment, the maximum oxygen storage capacity may be based on an operating time period of the oxidation catalyst or the amount of time the oxidation catalyst has been in operation. In such an embodiment, the exhaust aftertreatment condition module 110 may include predetermined data associating the maximum oxygen storage capacity of the oxidation catalyst with operating time periods. The exhaust aftertreatment condition module 110 may keep track up the operating time of the oxidation catalyst, and estimate the maximum oxygen storage capacity of the oxidation catalyst by comparing the operating time to the predetermined data. Alternatively, or additionally, the exhaust aftertreatment condition module 110 may estimate the maximum oxygen storage capacity based on physically detected conditions (e.g., exhaust gas temperature, oxidation catalyst temperature, pressure differential across the oxidation catalyst, and the like) of the oxidation catalyst and/or based on virtually calculated conditions of the oxidation catalyst.

According to some implementations, the desired quantity of stored oxygen to be added is associated with a quantity of oxygen that when added to oxygen already stored on the oxidation catalyst would equal a desired percentage of a maximum oxygen storage capacity of the oxidation catalyst. The desired percentage is 100% is one implementation, and between 0% and 100% in another implementation. According to other implementations, the desired quantity of stored oxygen to be added is associated with any of various other factors, such as a desired minimum quantity of oxygen stored on the oxidation catalyst, According to another embodiment, the exhaust condition demand 120 is an oxygen consumption demand representing a desired quantity of oxygen to facilitate a desired effect on or in the exhaust aftertreatment system 60. For example, the desired effect may be regeneration control and the exhaust condition demand 120 may be configured to control regeneration events on one or more components of the exhaust aftertreatment system 60. Regeneration events include artificially increasing the temperature of the exhaust gas by combusting excess hydrocarbons in a rich exhaust environment within the oxidation catalyst. Adding oxygen to the exhaust gas can facilitate the termination of a regeneration event, or slow down a runaway regeneration event where the exhaust gas temperature rises at a dangerously high rate. Accordingly, the exhaust aftertreatment condition module 110 may control (e.g., terminate or alter the characteristics of) a regeneration event by generating the exhaust condition demand 120 to demand an amount of oxygen be present in the exhaust gas stream to effectuate control of the regeneration event.

The controller 100 also includes an air-to-fuel ratio module 130 configured to determine an air-to-fuel ratio demand 140 based on the exhaust condition demand 120. The air-to-fuel ratio demand 140 represents a desired or demanded air-to-fuel ratio of the exhaust gas stream entering the exhaust aftertreatment system 60. Generally, the air-to-fuel ratio demand module 130 estimates a current air-to-fuel ratio in the exhaust gas stream entering the exhaust aftertreatment system 60 based on any of various techniques. In one implementation, the air-to-fuel ratio demand module 140 estimates the current air-to-fuel ratio based on input from physical sensors (e.g., at least one of an oxygen sensor and fuel sensor). Alternatively, or additionally, in some implementations, the air-to-fuel ratio demand module 140 estimates the current air-to-fuel ratio based on virtual sensors, which may include models and predetermined data associated with known operating conditions of the engine.

The air-to-fuel ratio demand module 130 determines the air-to-fuel demand 140 based on a comparison between the current air-to-fuel ratio and the exhaust condition demand 120. For example, as discussed above, the exhaust condition demand 120 is associated with a desired amount of oxygen in the exhaust gas for achieving a desired purpose. Based on various operating conditions, such as exhaust flow rate and/or space velocity, the air-to-fuel ratio module 130 is configured to determine whether the current the air-to-fuel ratio, or oxygen content, of the exhaust gas stream is sufficient to satisfy the exhaust condition demand 120, and generate the air-to-fuel ratio demand 140 accordingly. More specifically, if the air-to-fuel ratio module 130 determines that the current the air-to-fuel ratio, or oxygen content, of the exhaust gas stream is not sufficient to satisfy the exhaust condition demand 120, the module 130 may either generate an air-to-fuel ratio demand 140 that demands an air-to-fuel ratio equal to the current air-to fuel ratio, or not generate an air-to fuel ratio demand at all. However, if the air-to-fuel ratio module 130 determines that the current the air-to-fuel ratio, or oxygen content, of the exhaust gas stream is not sufficient to satisfy the exhaust condition demand 120, the module 130 generates an air-to-fuel ratio demand 140 that demands an air-to-fuel ratio equal to the desired air-to-fuel ratio.

Additionally, the controller 100 includes an air dithering module 150 that is configured to generate the air injection command 170 based on the air-to-fuel ratio demand 140. The air dithering module 150 generates a non-zero air injection command 170 when the air-to-fuel ratio demand 140 is received or the air-to-fuel ratio demand 140 demands an air-to-fuel ratio higher than the current air-to fuel ratio. Generally, in one embodiment, the air dithering module 150 generates an air injection command 170 commanding a quantity of air be injected into the exhaust gas stream by the air injector 72 that will increase the air-to-fuel ratio to the desired air-to-fuel ratio. In some implementations, the air dithering module 150 compares the current air-to-fuel ratio with the desired air-to-fuel ratio represented by the air-to-fuel ratio demand. The air dithering module 150 then generates an air injection command 170 that commands a quantity of injected air based on the difference between the current air-to-fuel ratio and the desired air-to-fuel ratio.

In some implementations, in addition to the quantity of injected air, the air injection command 170 may include the rate at which the command quantity of air is injected in to the exhaust gas stream. The commanded rate of air injection may be based on any of various factors, such as the condition of the oxidation catalyst, the quantity of stored oxygen on the oxidation catalyst (e.g., as a percentage of the maximum oxygen storage capacity of the oxidation catalyst), the speed-torque region in which the engine 12 is operating, the rate of change or transition of the engine operating conditions, the frequency of transient events on the engine, and the like. For example, air injection command 170 may command a higher rate of air injection to effectuate a faster increase in the air-to-fuel ratio of the exhaust gas should the frequency or magnitude of transient events on the engine be high.

Figure 3:
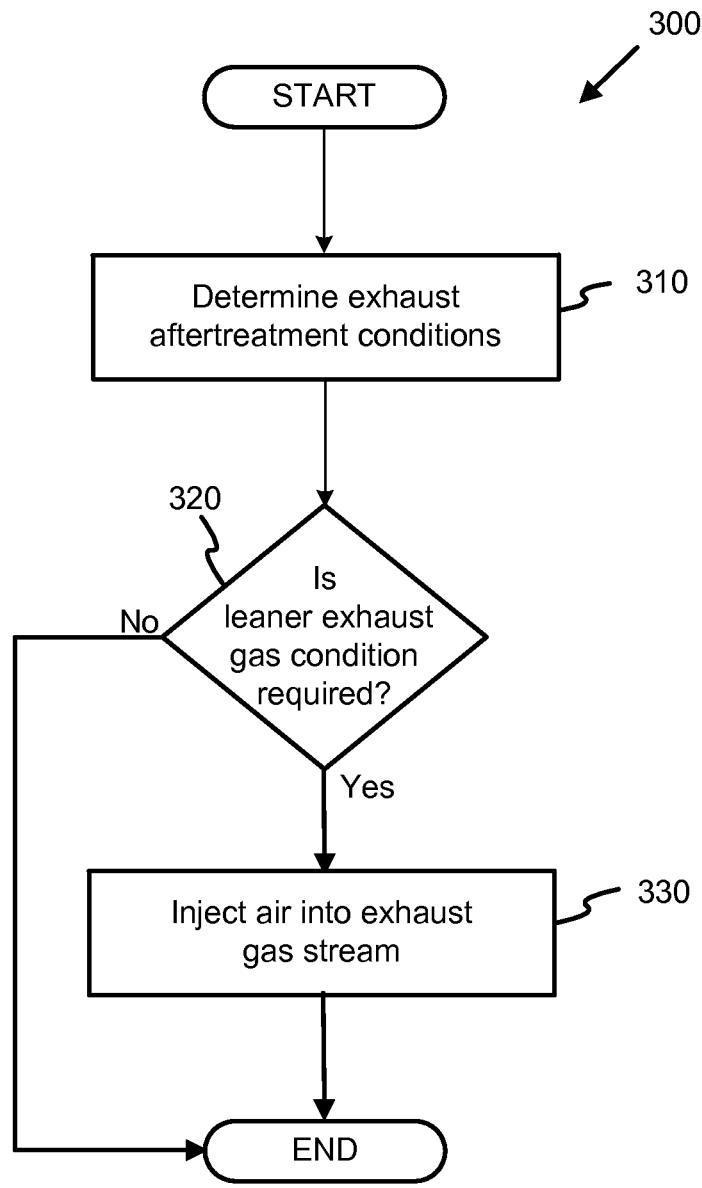
FIG. 3 is a schematic flow chart diagram of one embodiment of a method for dithering air into an exhaust system of an internal combustion engine system in accordance with one representative embodiment.

Referring to FIG. 3, according to one embodiment, a method 300 is disclosed for dithering air into an exhaust gas stream generated by an internal combustion engine. In certain implementations, the modules 110, 130, 150 execute the steps of the method 300. The method 300 starts and determines at least one condition of an exhaust aftertreatment system, which can include an oxidation catalyst among other components, at 310. Additionally, the method 300 determines whether leaner exhaust gas conditions are required in view of the at least one condition of the exhaust aftertreatment system at 320. For example, in one implementation, leaner exhaust gas conditions may be required following a predetermined time period of rich exhaust conditions (e.g., a rich operating cycle) to replenish stored oxygen on an oxidation catalyst that was released to oxidize excess hydrocarbons in the exhaust gas under the rich exhaust conditions. If leaner exhaust gas conditions are not required at 320, then the method 300 ends. However, if the leaner exhaust gas conditions are required at 320, then the method 300 proceeds to inject air into the exhaust gas stream at 330 and the method ends. The injection of air at 330 effectively increases the air-to-fuel ratio of the exhaust gas stream to provide leaner exhaust gas conditions. The oxygen added to the exhaust gas stream by virtue of the injected air may be equal to a loss of stored oxygen on the oxidation catalyst during a rich operating cycle. Alternatively, the oxygen added to the exhaust gas stream may be used to control the characteristics of a regeneration event on one or more components of an exhaust aftertreatment system.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An air dithering system for an internal combustion engine generating exhaust gas, comprising:
an exhaust line in exhaust gas receiving communication with the internal combustion engine;
an exhaust aftertreatment component positioned within the exhaust line in exhaust gas receiving communication with exhaust gas in the exhaust line;
an air injector in air injecting communication with exhaust gas in the exhaust line at a location downstream of the internal combustion engine and upstream of the exhaust aftertreatment component; and
a controller in electronic communication with the air injector, the controller configured to control the air injector to inject air into the exhaust gas based on an oxygen storage demand representing a desired quantity of stored oxygen to be added to the exhaust after treatment component, the desired quantity of stored oxygen based on an estimate of oxygen already stored on the exhaust aftertreatment component,
wherein the estimate of the amount of oxygen stored on the exhaust aftertreatment component is based on a maximum storage capacity of the exhaust aftertreatment component, and wherein the maximum oxygen storage capacity is calculated based on an amount of time the exhaust aftertreatment component has been operational.

2. The air dithering system of claim 1, wherein the air injector is coupled to the exhaust line upstream of the exhaust aftertreatment component.

3. The air dithering system of claim 1, wherein the air injector injects air directly into an inlet of the exhaust aftertreatment component.

4. The air dithering system of claim 1, further comprising an internal combustion engine generating the exhaust gas, wherein when an air-to-fuel ratio of an air and fuel mixture combusted by the internal combustion engine to generate the exhaust gas is less than 1.0, an air-to-fuel ratio of exhaust gas downstream of the air injector and upstream of the exhaust aftertreatment component is greater than 1.0.

5. The air dithering system of claim 1, wherein the air injector injects a quantity of air into the exhaust gas sufficient to render an air-to-fuel ratio of the exhaust gas greater than 1.0, and wherein the air-to-fuel ratio of exhaust gas upstream of the air injector is less than 1.0.

6. The air dithering system of claim 1, wherein the controller controls the air injector to inject air into the exhaust gas to create a lean condition within the exhaust gas.

7. The air dithering system of claim 1, wherein the air injector injects air into the exhaust gas for replenishing stored oxygen on the exhaust aftertreatment component.

8. The air dithering system of claim 1, wherein the internal combustion engine comprises an exhaust gas recirculation (EGR) line in exhaust receiving communication with the exhaust line and exhaust providing communication with the internal combustion engine, and
wherein the location is downstream of the EGR line.

9. The air dithering system of claim 1, wherein the exhaust line is in exhaust providing communication with the atmosphere, and wherein all the air injected by the air injector into the exhaust gas exits into the atmosphere via the exhaust line.

10. The air dithering system of claim 9, wherein all the air injected by the air injector into the exhaust gas passes through the exhaust aftertreatment component.

11. The air dithering system of claim 1, wherein the air injector comprises an electrically-controlled injector.

12. The air dithering system of claim 11, wherein the electrically-controlled injector is a solenoid-actuated injector.

13. A method for providing a lean condition in an exhaust gas stream generated by an internal combustion engine operating under a rich condition, comprising:

determining at least one condition of an exhaust aftertreatment system, the at least one condition including an oxygen storage demand representing a desired quantity of stored oxygen to be added to the exhaust after treatment component, the desired quantity of stored oxygen based on an estimate of oxygen already stored on the exhaust after treatment component, the estimate of the oxygen stored on the exhaust aftertreatment component based on a maximum oxygen storage capacity of the exhaust aftertreatment component, the maximum oxygen storage capacity calculated based on an amount of time the exhaust aftertreatment component has been operational;

requesting a lean condition in the exhaust gas based on the at least one condition of the exhaust aftertreatment system; and injecting air into the exhaust gas in response to the oxygen storage demand.

14. The method of claim 13, wherein the exhaust aftertreatment system comprises an oxidation catalyst and the at least one condition comprises an oxygen storage condition of the oxidation catalyst, wherein the lean condition in the exhaust gas is requested based on a deficiency in the oxygen storage condition of the oxidation catalyst.

* * * * *